United States Patent
Jang et al.

(10) Patent No.: US 10,996,760 B2
(45) Date of Patent: May 4, 2021

(54) DEVICE, SYSTEM AND METHOD FOR TACTILE SENSATION RECOGNITION

(71) Applicant: Daegu Gyeongbuk Institute of Science and Technology, Daegu (KR)

(72) Inventors: Jae Eun Jang, Daegu (KR); Che Il Moon, Daegu (KR); Ji Woong Choi, Suseong-gu (KR); Hong Soo Choi, Daegu (KR); Kyung Soo Kim, Daegu (KR); Dong Su Kim, Seongnam-si (KR); Kwon Sik Shin, Daegu (KR); Min Kyung Sim, Jinju-si (KR); Do Young Lee, Busan (KR); Sung Ho Lim, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 0 days.

(21) Appl. No.: 16/716,709

(22) Filed: Dec. 17, 2019

(65) Prior Publication Data

US 2020/0209972 A1      Jul. 2, 2020

(30) Foreign Application Priority Data

Dec. 31, 2018   (KR) .................. 10-2018-0174062

(51) Int. Cl.
*G06F 3/01*   (2006.01)

(52) U.S. Cl.
CPC .............. *G06F 3/016* (2013.01); *G06F 3/011* (2013.01); *G06F 3/017* (2013.01)

(58) Field of Classification Search
CPC ............................................. G06F 2203/04809
See application file for complete search history.

(56) References Cited

U.S. PATENT DOCUMENTS

| | | | |
|---|---|---|---|
| 2009/0019053 A1* | 1/2009 | Burgess ................. | G06Q 30/06 |
| 2011/0157088 A1* | 6/2011 | Motomura .............. | G06F 3/014 |
| | | | 345/174 |
| 2017/0097682 A1* | 4/2017 | Endo ...................... | G06F 3/0484 |
| 2018/0121722 A1 | 5/2018 | Chun et al. | |

FOREIGN PATENT DOCUMENTS

| | | |
|---|---|---|
| JP | 2000285138 A | 10/2000 |
| JP | 2002093058 A | 3/2002 |
| JP | 2018116054 A | 7/2018 |
| JP | 2019216947 A | 12/2019 |
| KR | 10-1844658 B1 | 4/2018 |

OTHER PUBLICATIONS

Office Action issued on Korean patent application 10-2018-0174062 dated Mar. 30, 2020, 7 pages.

* cited by examiner

*Primary Examiner* — Di Xiao
(74) *Attorney, Agent, or Firm* — Hauptman Ham, LLP

(57) ABSTRACT

Provided is a tactile sensation recognition device according to an embodiment of the disclosure including: a receiver configured to receive tactile sensation information obtained by sensing a surface of an object through a tactile sensor; a preference determiner configured to determine whether a user prefers the received tactile sensation information, based on a user tactile function $f_{user}(x)$; and a display displaying a user preference for the received tactile sensation information.

9 Claims, 6 Drawing Sheets

FIG. 3

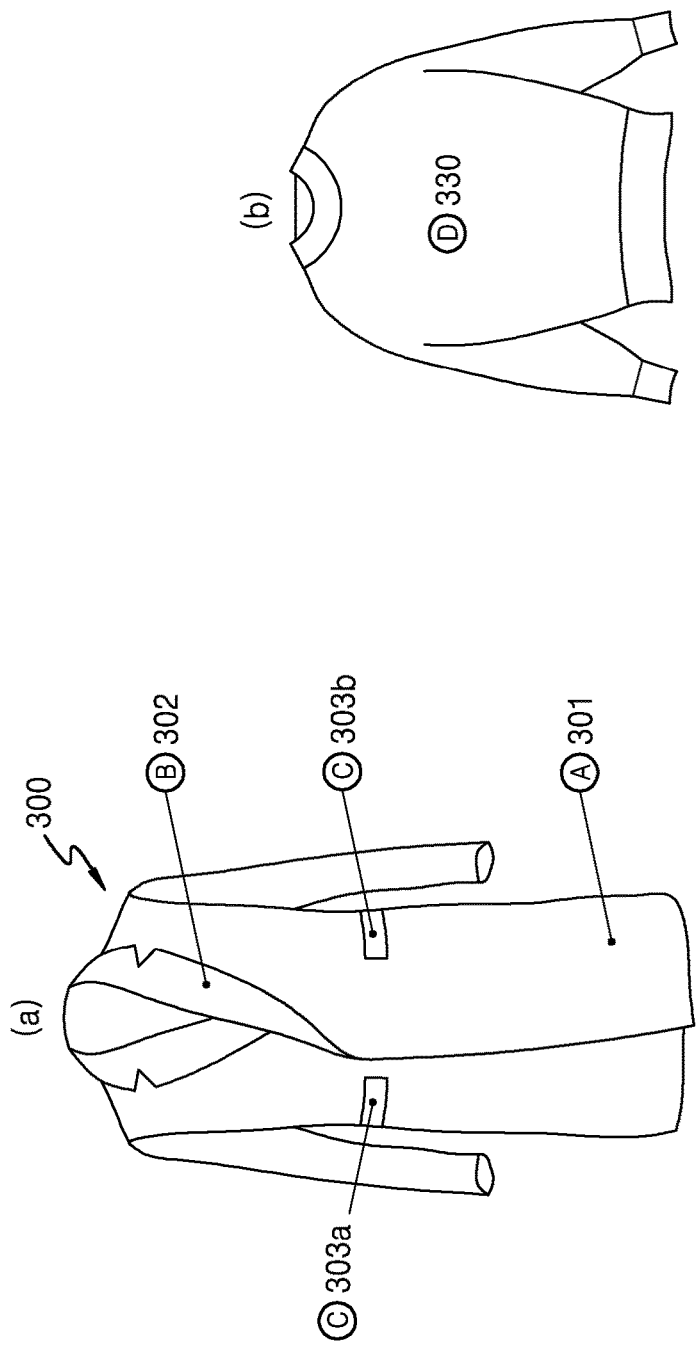

(a)

300
③ B 302
© 303b
Ⓐ A 301
© 303a

COLOR: CHARCOAL
MATERIAL:
OUTER SHELL: WOOL 50%, POLYESTER 50%
LINING: POLYESTER 100%
COLLAR: LEATHER 100%   320
TACTILE SENSATION DATA
A: FIRST TACTILE SENSATION MEASUREMENT DATA,
   TACTILE SENSATION PREFERRED BY ANDRE KIM
B: SECOND TACTILE SENSATION MEASUREMENT DATA
C: THIRD TACTILE SENSATION MEASUREMENT DATA

310 — 
311 — 
312 — 
313 —

(b)

Ⓓ 330

COLOR: BLACK
MATERIA: CASHMERE 5%, WOOL 15%, ACRYL 80%
OUTER SHELL: WOOL 50%, POLYESTER 50%
LINING: POLYESTER 100%
COLLAR: LEATHER 100%
TACTILE SENSATION DATA
D : TACTILE SENSATION PREFERRED BY
    PARK JI-SUNG —— 350

 — 340

DEVICE, SYSTEM AND METHOD FOR TACTILE SENSATION RECOGNITION

CROSS-REFERENCE TO RELATED APPLICATION

This application claims the benefit of Korean Patent Application No. 10-2018-0174062, filed on Dec. 31, 2018, in the Korean Intellectual Property Office, the disclosure of which is incorporated herein in its entirety by reference.

BACKGROUND

1. Field

The disclosure relates to a tactile sensation recognition device, and more particularly, to a method for enabling a user to indirectly recognize his or her preferred tactile sensation by using tactile sensation information of an object provided online without actually testing the tactile feeling of the object.

2. Description of Related Art

Efforts to apply the five human senses of sight, hearing, smell, taste, and touch to machines have been made for a long time, and as a result, various technologies for sensors related to the senses have been introduced and developed. Recently, tactility for application to robot fingers, etc. is becoming more and more important. In addition, to provide tactility to machines, studies are being conducted into an ideal tactile sensor that mimics human skin, instead of simply detecting touches.

PRIOR ART DOCUMENTS

Patent Documents

KR 10-1844658

SUMMARY

The disclosure provides a tactile sensation recognition function of recognizing an individual's tactile taste or tactile preference by using a tactile sensor.

Additional aspects will be set forth in part in the description which follows and, in part, will be apparent from the description, or may be learned by practice of the presented embodiments of the disclosure.

According to an embodiment of the disclosure, there is provided a tactile sensation recognition device including: a receiver configured to receive tactile sensation information obtained by sensing a surface of an object through a tactile sensor; a preference determiner configured to determine whether a user prefers the received tactile sensation information, based on a user tactile function $f_{user}(x)$; and a display displaying a user preference for the received tactile sensation information.

The user tactile function $f_{user}(x)$ may be acquired by cumulatively machine-training a user's preference test results for tactile sensation information sensed after the user presses and rubs each standard sample with the tactile sensor, or by machine-training the user's preference test results for each variable constituting the sensed tactile sensation information, and the variable constituting the sensed tactile sensation information may include at least one of a pressure change, temperature, hardness, a frictional force, roughness, or a surface shape.

The preference determiner may be further configured to match the tactile sensation information received by the receiver with a tactile sensation information value sensed from a pre-stored standard sample that is most similar to the tactile sensation information, and input the tactile sensation information value as a x value of the tactile function $f_{user}(x)$ to the tactile function $f_{user}(x)$ to determine a preference.

When the object is clothing or a fabric made of one or more materials, the display may display a user preference for at least one of the one or more materials constituting the clothing or the fabric.

According to another embodiment of the disclosure, there is provided a tactile sensation recognition system of enabling a second terminal to recognize a tactile sensation through communication with a first terminal, the tactile sensation recognition system including: the first terminal configured to provide tactile sensation information obtained by sensing a surface of an object through a tactile sensor; and the second terminal configured to receive the tactile sensation information, determine whether a user prefers the tactile sensation information based on a user tactile function $f_{user}(x)$, and display a user preference for the tactile sensation information.

According to another embodiment of the disclosure, there is provided a tactile sensation recognition device including: a tactile sensation information provider configured to provide tactile sensation information obtained by sensing a surface of an object through a tactile sensor; and a user preference manager configured to store a tactile function $f_{user}(x)$ for each user, and manage a user preference for the tactile sensation information for each user based on the tactile function $f_{user}(x)$ stored for each user.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 2 and 3 show an embodiment of the disclosure in which a first terminal of FIG. 1 provides tactile sensation information;

DETAILED DESCRIPTION

Figure 1:
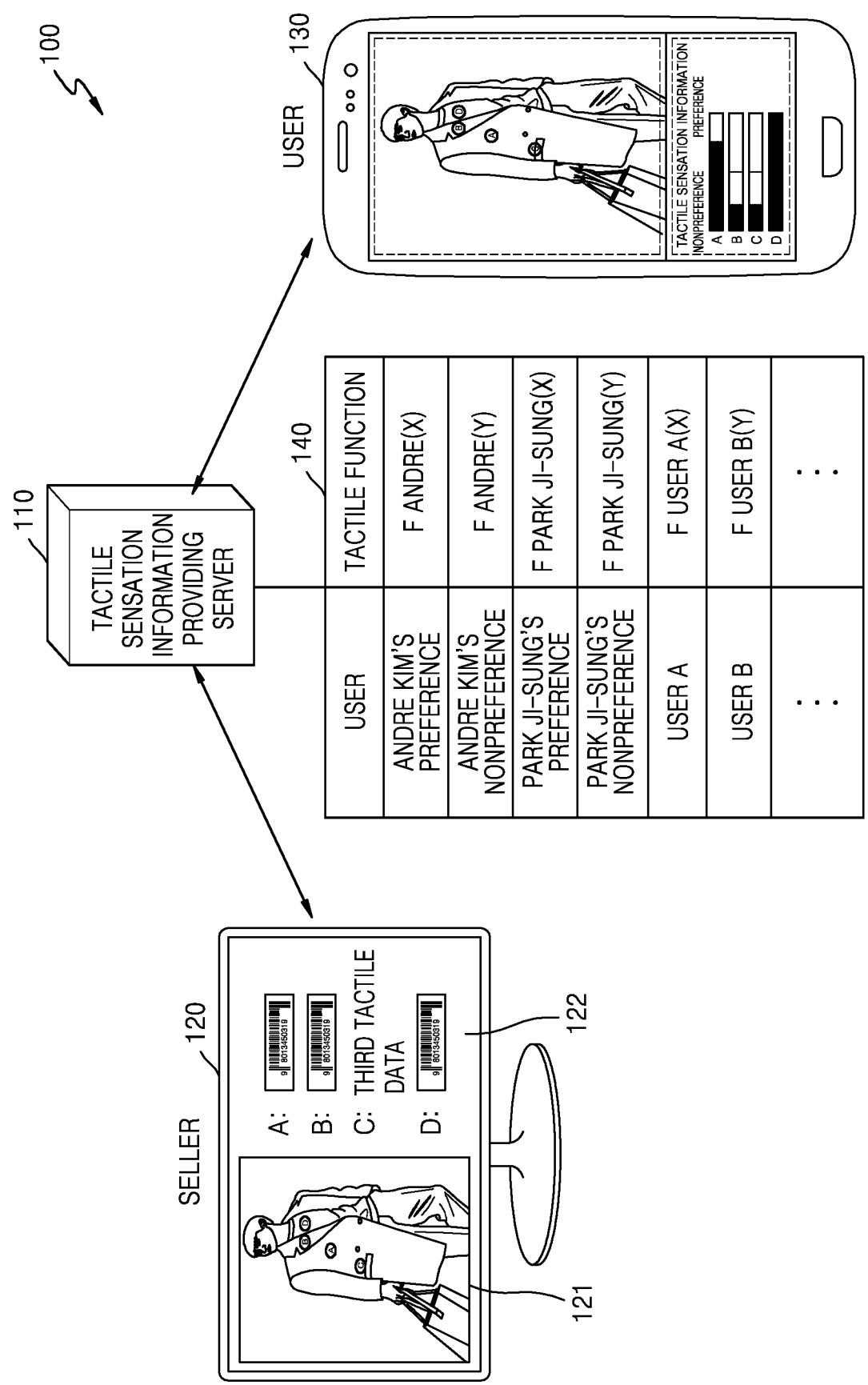
FIG. 1 shows a tactile sensation information providing system in which a tactile sensation recognition device is implemented, according to an embodiment of the disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, descriptions will be given with reference to the accompanying drawings.

Figure 2:
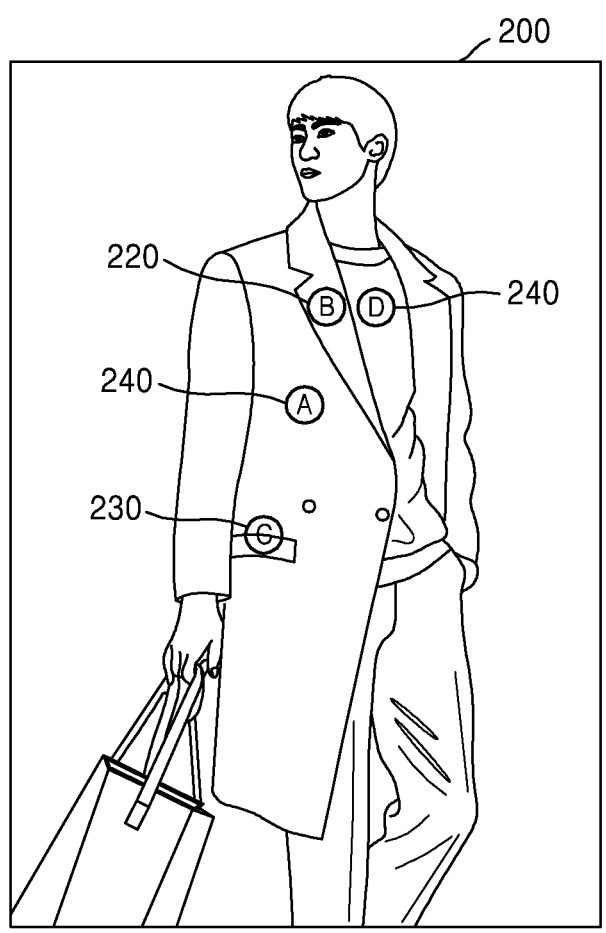
Figure 4:
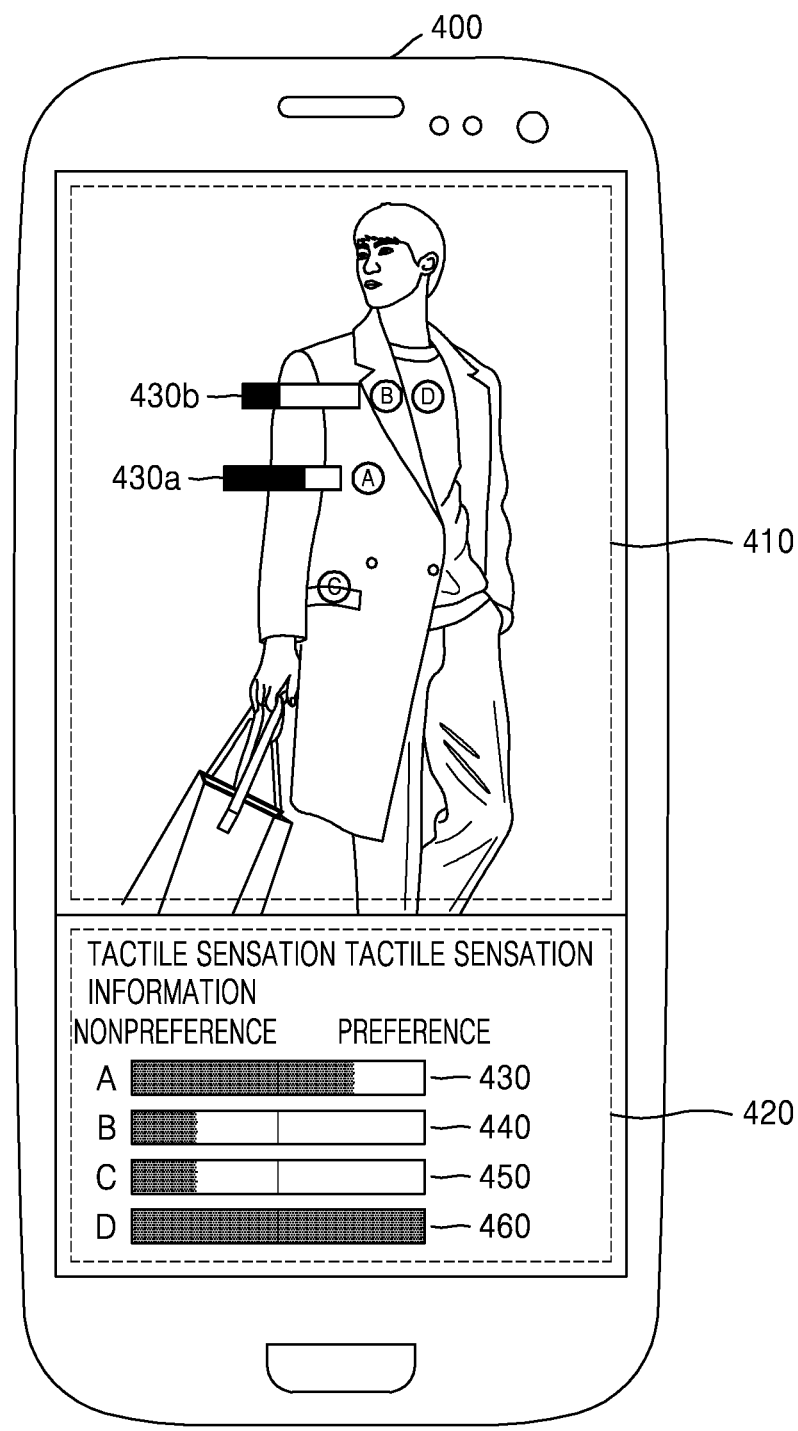
FIG. 4 shows an example of displaying a user's preferences with respect to received tactile sensation information in a second terminal of FIG. 1, according to an embodiment of the disclosure.

FIG. 1 shows a tactile sensation information providing system in which a tactile sensation recognition device is implemented, according to an embodiment of the disclosure. FIGS. 2 and 3 show an embodiment of the disclosure in which a first terminal 120 of FIG. 1 provides tactile sensation information. FIG. 4 shows an example in which a second terminal 130 of FIG. 1 displays a user's preferences for tactile sensation information provided from the first terminal 120.

According to an embodiment of the disclosure, a tactile sensation information providing system 100 may include the first terminal 120 and the second terminal 130. Also, the tactile sensation information providing system 100 may further include a tactile sensation information providing server 110 capable of communicating with the first terminal 120 or the second terminal 130 in a wired or wireless fashion. The first and second terminals 120 and 130 may include a mobile phone, a smart phone, a laptop computer, a personal computer (PC), a handheld device, a wearable device, a robot, a television (TV), a tablet, a smart watch, etc., and may also include all kinds of devices capable of communicating with a tactile sensor in a wired/wireless fashion and including a processor capable of receiving tactile sensation information and machine-training and processing a user's preferences.

According to an embodiment of the disclosure, the first terminal 120 may include a clothing seller's terminal, and the second terminal 130 may include a terminal of a purchaser who wants to purchase clothing. Referring to FIG. 1, the clothing seller with the first terminal 120) may provide an image 121 of clothing which the clothing seller sells and tactile sensation information 122 about materials constituting the clothing to the buyer with second terminal 130. Then, on the second terminal 130, tactile preference information for the tactile sensation information 122 about the materials provided by the clothing seller may be displayed. The operation will be described in more detail with reference to FIGS. 2 to 5, later.

According to an embodiment of the disclosure, the first terminal 120 and the second terminal 130 may include the same kind of tactile sensor. An example of the tactile sensor will be described with reference to FIG. 6. The first terminal 120 may communicate with the tactile sensor (not shown) in a wired/wireless fashion, and provide tactile sensation information sensed by the tactile sensor. The second terminal 130 may communicate with the tactile sensor (not shown) in a wired/wireless fashion, receive the tactile sensation information provided from the first terminal 120, and display a user's preference for the received tactile sensation information.

The user's preference may have been trained in advance through machine-training. The user may perform a process of sensing tactile sensation information about standard samples composed of various textiles or leathers through a tactile sensor and recording test results for his/her preferences for the sensed tactile sensation information. The machine-training may be performed by using physical signal values sensed by the tactile sensor as input values and test result values for a user's preferences for objects sensed by the tactile sensor as output values. In this case, the test result values for the user's preferences may be based on personal tactile determinations, such as rough, soft, preferred cotton, nonpreferred wool, etc. The input values of the machine-training may be used by pressing and rubbing the same sample with the tactile sensor by various methods to acquire a plurality of pieces of input data. As a machine-training method, a deep neural network method may be used, and also, other various methods may be used.

In the current specification, a user's preference is used as the same meaning as a 'result value of a tactile function $f_{user}(x)$'. In the tactile function $f_{user}(x)$, x means an object. According to an embodiment of the disclosure, the tactile function $f_{user}(x)$ may also be expressed in the form of $f_{user}(x_1, x_2, x_3, \ldots, x_n)$, and in this case, $x_1, x_2, x_3, \ldots, x_n$ may represent variables that are sensed when a surface of an arbitrary object is sensed by the tactile sensor. The variables may include a pressure change, temperature, hardness, a frictional force, roughness, a surface shape, etc., which are detected when the surface of the object is sensed.

According to an embodiment of the disclosure, a first user may acquire a tactile function $f_{first\ user}(x)$ by cumulatively machine-training preference test results for tactile sensation information sensed after pressing and rubbing each standard sample with a tactile sensor. The standard samples may be composed of tens to hundreds of textiles or leathers, and may also be composed of samples that are similar to or the same as materials of which a person wants to indirectly feel a tactile sensation later.

According to another embodiment of the disclosure, the tactile function may be machine-trained in the form of $f_{user}(x)$ or $f_{user}(x_1, x_2, x_3, \ldots, x_n)$. By machine-training test results for the user's preferences for individual variables constituting tactile sensation information, a tactile function $f_{first\ user}$(pressure change, temperature, hardness, frictional force, roughness, surface textile, . . . ) may be acquired and stored in a storage device of a terminal or in a tactile sensation information table 140 of the tactile sensation information providing server 110.

For example, an individual user's taste, such as $f_{user}$(standard sample 1)=preference of 85%, $f_{user}$(standard sample 2)=preference of 15%, etc., may be machine-trained. Also, training may be performed in the form of $f_{user}$(pressure change, temperature, hardness, frictional force, roughness, and surface shape of standard sample 1), $f_{user}$(pressure change, temperature, hardness, frictional force, roughness, and surface shape of standard sample 2), etc., and in this case, a user's preferences for individual variables of pressure change, temperature, hardness, frictional force, roughness, and surface shape may be machine-trained.

Also, $f_{user}$(cotton)=preference of 100% and $f_{user}$(polyester)=preference of 20%. When a value of $f_{user}(x)$ exceeds 50%, preference may be determined, and when a value of $f_{user}(x)$ is smaller than 50%, nonpreference may be determined. In this way, result values of $f_{user}(x)$ may be processed variously. Also, when the same material is processed or manufactured to different forms or textures, $f_{user}$(first kind of cotton)=preference of 30% and $f_{user}$(second kind of cotton)=preference of 70% may be determined.

According to an embodiment of the disclosure, when tactile sensation information about an unknown object x is input to the tactile function $f_{user}(x)$ that is used by the second terminal 130 or the tactile sensation information providing server 110, a preference determiner of the second terminal 130 or the tactile sensation information providing server 110 may match the tactile sensation information about the unknown object x with a tactile sensation information value sensed from a pre-stored standard sample that is most similar to the tactile sensation information about the unknown object x, and provide the user's predicted preference information about the unknown object x.

According to an embodiment of the disclosure, the tactile sensation information providing server 110 may further include the tactile sensation information table 140 for informing a user's tactile preferences for objects. The tactile sensation information table 140 may store and manage information about users' preferences or nonpreferences for objects according to each user. The tactile sensation information table 140 may store and manage a tactile function $f_{user}(x)$ for each user.

FIGS. 2 and 3 show an embodiment of the disclosure in which the first terminal of FIG. 1 provides tactile sensation information.

Referring to FIG. 2, the first terminal 120 of FIG. 1 may display areas A 210, B 220, C 230, and D 240 for which tactile sensation information is provided, in a screen in which clothing to be sold is displayed. Referring further to FIG. 3, a clothing seller may provide tactile sensation information together with an image 300 of clothing or a fabric or separately from the image 300 of the clothing and fabric (310, 311, 312, and 313), in a screen in which details information about clothing is displayed.

Referring to FIGS. 2 and 3, when clothing or a fabric is made of one or more materials, the clothing seller may provide tactile sensation information about at least one of the one or more materials constituting the clothing or fabric. For example, when a material B of a collar area 302, a material C of pocket entrances 303a and 303b, and a material A of an outer shell 301 in a coat of FIG. 3 are different materials or are manufactured by different processing methods although being the same material to provide different tactile sensations, the clothing seller may provide tactile measurement data 311, 312, and 313 measured for the materials A (301), B (302), and C (303a and 303b) by a tactile sensor. Also, when clothing 330 is made of the same material D, the clothing seller may provide tactile measurement data 340. However, it needs to be noted that, when the clothing 330 made of the same material D are manufactured by several processing methods to provide different tactile sensations, the clothing seller may provide a plurality of pieces of tactile measurement data. The tactile measurement data 311, 312, 313, and 340 may be transmitted in the form of a barcode, a quick response (QR) code, or the like.

FIG. 4 shows an embodiment of the disclosure in which the second terminal of FIG. 1 provides a user's preference information after receiving tactile sensation information. The buyer's terminal 130 may receive tactile sensation information provided on a screen in which clothing to be sold is displayed, from the seller's terminal 120 of FIG. 1. In this case, according to the embodiment of FIG. 4, a tactile sensation information providing interface 420 showing information about a purchaser's tactile preferences for individual materials constituting clothing may be provided on a screen 410 in which the clothing to be sold through the first terminal 120 of FIG. 1 is displayed.

For example, a purchaser's preferences 430, 440, 450, and 460 for tactile sensation information A, B, C, and D provided from the first terminal 120 of FIG. 1 may be displayed. FIG. 4 shows an embodiment in which the tactile sensation information providing interface 420 is displayed separately. However, information about a user's preferences 430a and 440a may overlap with the tactile sensation information A, B, C, and D in the screen 410 in which clothing to be sold through the seller's terminal 120 is displayed. That is, various modifications may be possible.

Figure 5:
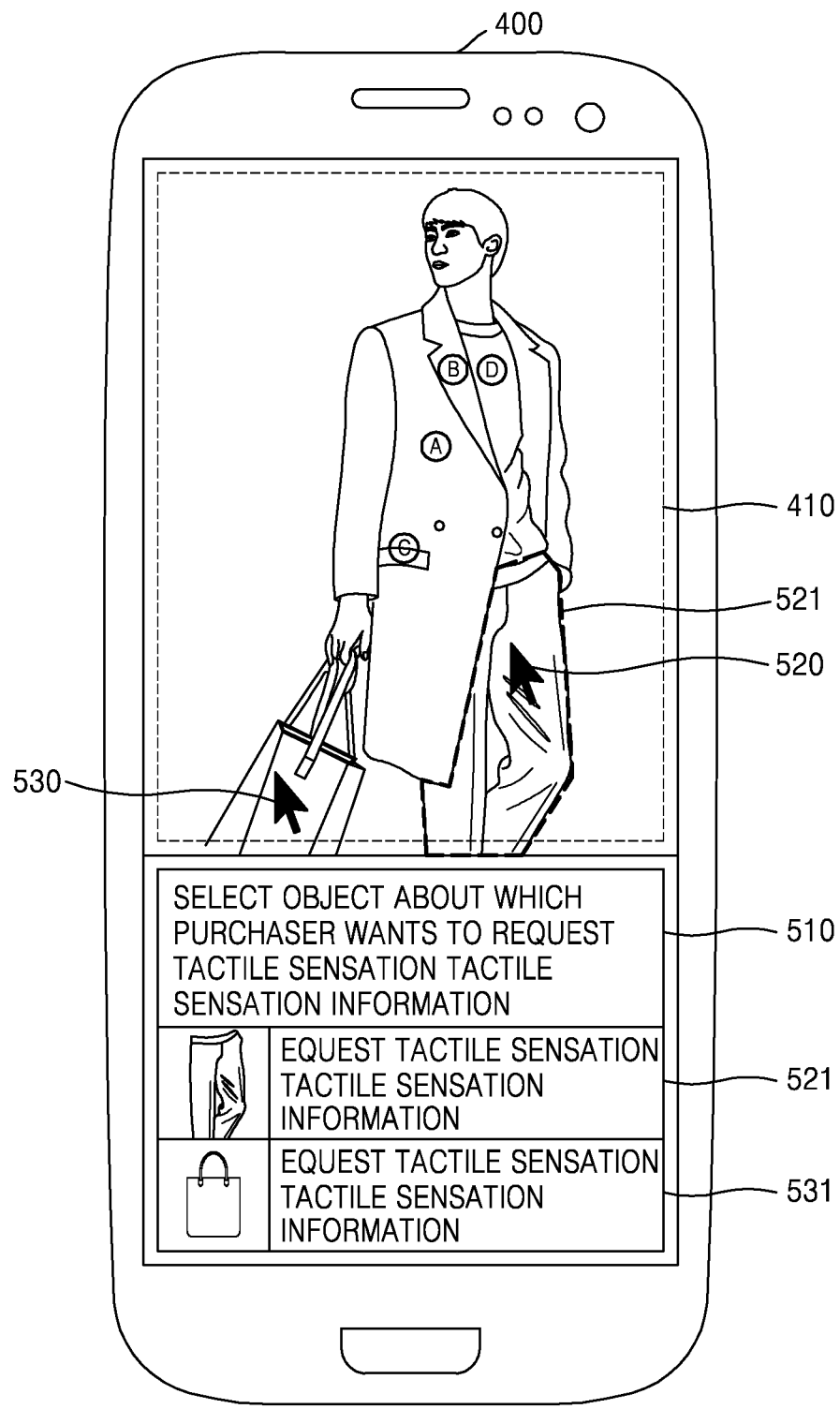
FIG. 5 shows an example in which the second terminal of FIG. 1 requests the first terminal to send tactile sensation information, according to an embodiment of the disclosure.

FIG. 5 shows an example in which a purchaser terminal 400 provides a tactile sensation information request interface 510 for enabling a purchaser to request tactile sensation information about his/her desired object, clothing or fabric, when seeing the screen 410 displaying clothing provided from the first terminal 120 through the purchaser terminal 400, according to an embodiment of the disclosure.

The purchaser may request tactile sensation information about clothing, a fabric, an object, etc. about which a clothing seller has provided no tactile sensation information, through the purchaser terminal 400. The purchaser may select objects 520 and 530 about which he/she wants to request tactile sensation information through the tactile sensation information request interface 510, and when the selections are activated (521 and 531), the purchaser may request tactile sensation information about the objects 520 and 530. The purchaser may also designate a portion (for example, sleeves, a neckline, etc.) of clothing by using the tactile sensation information request interface 510 and request tactile sensation information about the designated portion.

Figure 6:
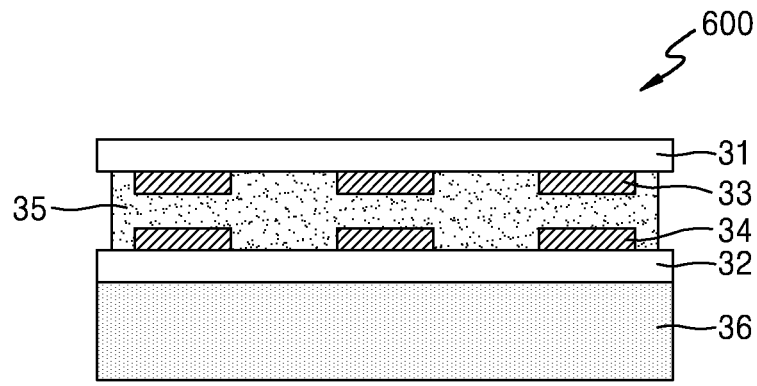
FIG. 6 shows an internal configuration of a tactile sensor according to an embodiment of the disclosure.

FIG. 6 shows an example of a tactile sensor that is used by the first terminal or the second terminal of FIG. 1, according to an embodiment of the disclosure.

According to an embodiment of the disclosure, the tactile sensor may sense a contact/non-contact, an intensity of touch, a speed of touch, etc. with respect to an object to sense a tactile data signal providing information about a surface characteristic of the object. The tactile data signal may be a unique value corresponding to the surface characteristic of the object, and be stored and managed together with the object and the surface characteristic of the object.

According to an embodiment of the disclosure, the tactile sensor may calculate, by a sliding movement of an object, surface characteristics of the object, such as shapes and intervals of protrusions formed on a surface of the object and a friction coefficient of the object.

Referring to FIG. 6, a tactile sensor 600 may include a first substrate 31 and a second substrate 32 positioned such that a plurality of electrodes 33 and 34 are opposite to each other, and a piezoelectric layer 35 positioned between the first substrate 31 and the second substrate 32. The plurality of electrodes 33 and 34 may be arranged in the form of a 2Dimensional (2D) array on opposite surfaces of the first substrate 31 and the second substrate 32. When a contact of an object is sensed, a change of a voltage between the first electrode 33 and the second electrode 34 may be detected.

A piezoelectric material forming the piezoelectric layer 35 may include, for example, an inorganic material, such as barium titanate ($BaTiO_3$), lead zirconate titanate (PZT), lead titanate ($PbTiO_3$), or strontium titanate ($SrTiO_3$), or a polycrystalline organic material such as polyvinylidene fluoride (PVDF), although not limited thereto. Also, the piezoelectric layer 35 may sense a contact by using various methods, such as a capacitive method, a resistive method, and a superconductive method.

The tactile sensor 600 may sense intervals between fine protrusions formed on a surface of an object, etc. by using the electrodes 33 and 34 arranged in the form of an array. The tactile sensor 600 may further include a speed indicator such as a gyroscope to calculate a moving speed of an object.

The tactile sensor 600 may sense a sliding movement of an object by using cells arranged on the substrates 31 and 32, thereby calculating a friction coefficient, shapes and intervals of protrusions, etc., which are surface characteristics of the object.

The tactile sensor 600 may further include a support layer 36 having elasticity. The support layer 36 may be implemented as a sealed structure including a sponge, silicon, rubber, a gas, or liquid. The support layer 36 may be positioned on a rear surface of the tactile sensor 600. The rear surface may be an opposite surface of a surface (a front surface) which an object contacts. The support layer 36 may have a curved surface. In this case, the tactile sensor 600 may be positioned on the curved surface, and the first substrate 31 and the second substrate 32 may have a shape corresponding to the curved surface.

The tactile sensor 600 may measure hardness of an object by using the support layer 36 having the curved surface. A hard object may contact a small area of the curved surface because the hard object is slightly deformed when contacting the tactile sensor 600, whereas a soft object may contact a relatively wide area of the curved surface because the soft material is greatly deformed when contacting the tactile sensor 600.

The tactile sensor 600 may also include a temperature sensor to sense temperature of an object or a change in temperature caused by a movement of an object through the temperature sensor.

Figure 7:
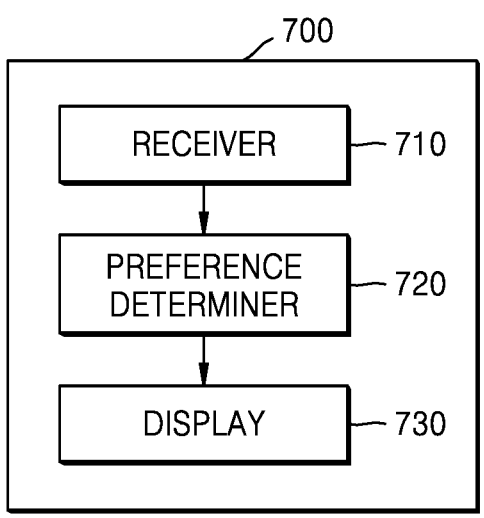
FIG. 7 shows an internal configuration of a tactile sensation recognition device according to an embodiment of the disclosure.

FIG. 7 shows an internal configuration of a tactile sensation recognition device 700 according to an embodiment of the disclosure.

An embodiment of the tactile sensation recognition device 700 may be the second terminal 130 of FIG. 1. The tactile sensation recognition device 700 may receive tactile sensation information through a receiver 710. In this case, the tactile sensation information indicates information obtained by sensing a surface of an object through the tactile sensor 600 according to the example of FIG. 6 in the first terminal 120 of FIG. 1.

The tactile sensation recognition device 700 may determine whether a user prefers the received tactile sensation information, based on a user tactile function $f_{user}(x)$ stored in advance through machine-training, and display a preference for the received tactile sensation information on a display 730. An example of displaying preferences on the display 730 of the tactile sensation recognition device 700 has been described above with reference to FIG. 4 (see 420, 430, 440, 450, and 460).

Figure 8:
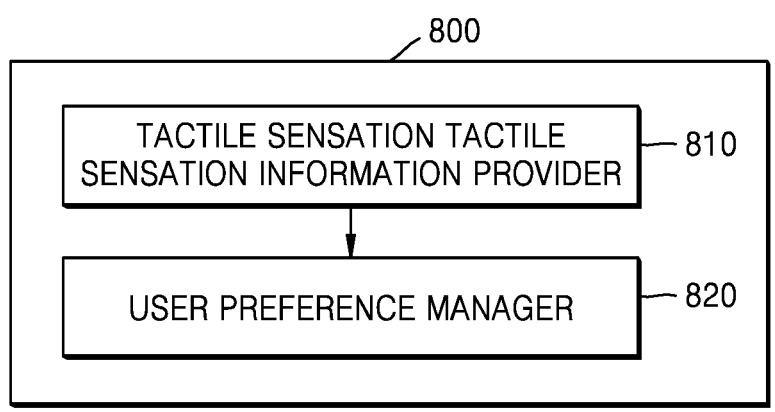
FIG. 8 shows an internal configuration of a tactile sensation recognition device according to another embodiment of the disclosure.

FIG. 8 shows an internal configuration of a tactile sensation recognition device 800 according to another embodiment of the disclosure.

Another embodiment of the tactile sensation recognition device 800 may include a case in which the first terminal 120 of FIG. 1 communicates with the tactile sensation information providing server 110 in a wired/wireless fashion or itself implements a function of the tactile sensation information providing server 110.

The tactile sensation recognition device 800 may include a tactile sensation information provider 810 and a user preference manager 820. The tactile sensation information provider 810 may provide tactile sensation information obtained by sensing a surface of an object through a tactile sensor to the user preference manager 820. In this case, according to the embodiment of FIG. 3, the tactile sensation information provider 810 may provide the tactile measurement data 311, 312, 313, and 340 for the materials A, B, C, and D The user preference manager 820 may have stored a tactile function $f_{user}(x)$ for each user in advance, and manage a user preference for tactile sensation information for each user based on the tactile function $f_{user}(x)$ stored in advance for each user. An example of the user preference manager 820 may be the tactile sensation information table 140 of FIG. 1.

In this case, the tactile sensation recognition device 800 may further provide user preference information stored in the user preference manager 820 together with the tactile sensation information. Referring to the embodiment of FIG. 3, the tactile sensation recognition device 800 may further provide information 320 indicating that the material A (311) has a tactile sensation preferred by Andre Kim and information 350 indicating that the material D (340) has a tactile sensation preferred by Park Ji-sung.

The tactile sensation recognition device 800 may predict pre-stored users' preferences for tactile sensation information obtained by sensing a surface of an arbitrary object, based on the tactile function $f_{user}(x)$ for each user stored in advance in the user preference manager 820. Also, the tactile sensation recognition device 800 may recommend clothing manufactured to have kinds of tactile sensations preferred by each user, based on the user preference information stored in the user preference manager 820, or may sell the user preference information stored in the user preference manager 820 to a subcontractor or a clothing manufacturer.

The device described above may be implemented with a hardware component, a software component, and/or a combination of a hardware component and a software component. For example, the device and components described in the embodiments may be implemented by using one or more general-purpose computers or a special-purpose computer, such as, for example, a processor, a controller, an arithmetic logic unit (ALU), a digital signal processor, a microcomputer, a field programmable gate array (FPGA), a programmable logic unit (PLU), a microprocessor, or another device capable of executing and responding to instructions. The processor may execute operating system (OS) and one or more software applications that are executed on the OS. Also, the processor may access, store, control, process, and create data in response to execution of software.

According to an embodiment of the disclosure, the tactile sensation recognition device may enable a user to indirectly recognize his/her preferred tactile sensation online based on tactile sensation information of an object, without actually recognizing a tactile sensation of the object.

According to an embodiment of the disclosure, the tactile sensation recognition device may allow a user to determine, when purchasing clothing online, whether a tactile sensation of the clothing is his/her preferred tactile sensation.

According to an embodiment of the disclosure, a purchaser may determine whether a material of clothing is his/her preferred material, based on tactile sensation information provided by a seller who sells clothing online.

According to another embodiment of the disclosure, a clothing seller may recommend clothing of a purchaser's preferred tactile sensation based on tactile function information including data about individual purchasers' tactile sensation preferences.

According to another embodiment of the disclosure, individual users' tactile function information may be used when clothing or materials are manufactured and sold.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A tactile sensation recognition device comprising:
   a receiver configured to receive, from a server via a communication network, tactile sensation information;
   a tactile sensor configured to sense a surface of an object of standard samples;
   a display configured to display a user preference for the received tactile sensation information;
   a processor configured to
      generate a user tactile function $f_{user}(x)$ of a user by using the tactile sensor,
      determine whether a user prefers the received tactile sensation information, based on the user tactile function $f_{user}(x)$; and
      display, on the display, the user preference for the received tactile sensation information based on the determination on the received tactile sensation information,
   wherein the processor is configured to generate the user tactile function $f_{user}(x)$ of the user by:
      generating sensed tactile sensation information on the surface of the object; and
      machine-training the user tactile function $f_{user}(x)$ using a user's preference result on the sensed tactile sensation information, and
   wherein the sensed tactile sensation information includes at least one of a pressure change, temperature, hardness, a frictional force, roughness, and a surface shape.

2. The tactile sensation recognition device of claim 1, wherein the processor is further configured to
   match the received tactile sensation information with the sensed tactile sensation information on the standard samples that is most similar to the received tactile sensation information, and
   determine the user preference for the received tactile sensation information based on the user tactile function $f_{user}(x)$ of the sensed tactile sensation information matched with the received tactile sensation information.

3. The tactile sensation recognition device of claim 1, wherein,
   when the object is clothing made of one or more materials, the processor is configured to display a first user preference for at least one of the one or more materials constituting the clothing.

4. The tactile sensation recognition device of claim 3, wherein
   the processor is configured to display the first user preference for the at least one of the one or more materials by overlapping the first user preference with an image of the clothing, and a location at which the first user preference overlaps the image corresponds to a location of a material from which the received tactile sensation information is sensed.

5. A tactile sensation recognition system comprising:
   a first terminal comprising a transmitter configured to transmit tactile sensation information; and
   a second terminal comprising
      a receiver configured to receive, from the first terminal via a communication network, the tactile sensation information;
      a tactile sensor configured to sense a surface of an object of standard samples;
      a display configured to display a user preference for the received tactile sensation information;
      a processor configured to
         generate a user tactile function $f_{user}(x)$ of a user by using the tactile sensor,
         determine whether a user prefers the received tactile sensation information, based on the user tactile function $f_{user}(x)$ of the user, and
         display, on the display, the user preference for the received tactile sensation information based on the determination on the received tactile sensation information,
      wherein the processor is configured to generate the user tactile function $f_{user}(x)$ of the user by:
         generating sensed tactile sensation information on the surface of the object; and
         machine-training the user tactile function $f_{user}(x)$ using a user's preference result on the sensed tactile sensation information, and
      wherein the sensed tactile sensation information includes at least one of a pressure change, temperature, hardness, a frictional force, roughness, and a surface shape.

6. The tactile sensation recognition system of claim 5, wherein the first terminal further comprises:
   a memory configured to store a plurality of user tactile function $f_{user}(x)$s for each user; and
   a first processor configured to manage each user preference for tactile sensation information based on the plurality of user tactile function $f_{user}(x)$s.

7. The tactile sensation recognition system of claim 6, wherein the first processor is further configured to predict the each user preference for tactile sensation information for a surface of an arbitrary object, based on the plurality of tactile function $f_{user}(x)$s.

8. The tactile sensation recognition system of claim 5, wherein the processor of the second terminal is further configured to
   provide a tactile sensation information request interface, on the display, for enabling a user to request tactile sensation information for a portion of a surface of a first object sensed by the first terminal.

9. A tactile sensation recognition method, the tactile sensation recognition method executed by a tactile sensation recognition device comprising a receiver, a tactile sensor, a processor, and a display, the tactile sensation recognition method comprising:
   receiving, through the receiver, tactile sensation information;
   sensing, by the tactile sensor, a surface of an object of standard samples;
   generating, by the processor, sensed tactile sensation information on the surface of the object;
   machine-training, by the processor, a user tactile function $f_{user}(x)$ using a user's preference result on the sensed tactile sensation information;
   determining, by the processor, whether a user prefers the received tactile sensation information, based on the user tactile function $f_{user}(x)$; and
   displaying, through the display, a user preference for the received tactile sensation information based on the determination on the received tactile sensation information, wherein the sensed tactile sensation information includes at least one of a pressure change, temperature, hardness, a frictional force, roughness, or a surface shape wherein the determining comprising matching, by the processor, the received tactile sensation information with the sensed tactile sensation information on the standard samples that is most similar to the received tactile sensation information, and determining the user preference for the received tactile sensation information based on the user tactile function $f_{user}(x)$ of the sensed tactile sensation information matched with the received tactile sensation information.

* * * * *